United States Patent
Hardham et al.

(10) Patent No.: US 11,995,683 B2
(45) Date of Patent: May 28, 2024

(54) SYSTEM AND METHOD FOR PROVIDING INFORMATION

(71) Applicant: Honeycomb Media Pty Ltd, Brunswick (AU)

(72) Inventors: Lee Hardham, Brunswick (AU); Rajesh Yeluri, Brunswick (AU)

(73) Assignee: Honeycomb Media Pty Ltd, Brunswick (AU)

( * ) Notice: Subject to any disclaimer, the term of this patent is extended or adjusted under 35 U.S.C. 154(b) by 530 days.

(21) Appl. No.: 16/580,563

(22) Filed: Sep. 24, 2019

(65) Prior Publication Data

US 2020/0019992 A1 Jan. 16, 2020

Related U.S. Application Data

(63) Continuation of application No. PCT/AU2018/050249, filed on Mar. 19, 2018.

(30) Foreign Application Priority Data

Mar. 24, 2017 (AU) ................................ 2017901317

(51) Int. Cl.
*G06Q 30/02* (2023.01)
*G06Q 30/0251* (2023.01)

(52) U.S. Cl.
CPC ..... *G06Q 30/0261* (2013.01); *G06Q 30/0267* (2013.01); *G06Q 30/0269* (2013.01)

(58) Field of Classification Search
CPC ..................................... G06Q 30/0207–0277
See application file for complete search history.

(56) References Cited

U.S. PATENT DOCUMENTS

| 8,781,502 B1 * | 7/2014 | Middleton | .......... | H04L 63/0435 |
| | | | | 455/456.3 |
| 8,990,287 B2 * | 3/2015 | Stewart | .............. | G06Q 30/0255 |
| | | | | 709/201 |

(Continued)

OTHER PUBLICATIONS

Trademark Electronic Search System (TESS), Bluetooth, Feb. 3, 2022, United States Patent and Trademark Office (Year: 2022).*

(Continued)

*Primary Examiner* — David J Stoltenberg
(74) *Attorney, Agent, or Firm* — Kilpatrick Townsend & Stockton LLP

(57) ABSTRACT

A messaging system comprising: a user device to: receive a beacon ID from a local beacon device when within a communication distance of the local beacon device; communicate information enabling a merchant database to identify a merchant profile associated with the local beacon device in response to receiving the beacon ID; and receive product message(s) for presentation via a user interface of the user device, the merchant database comprising merchant profile(s), each merchant profile comprising data entries associated with product(s), a user database comprising user profile(s), and a comparison server to: receive from the merchant database a merchant profile associated with a beacon ID obtained by the user device and a user profile associated with the user device from the user database; identify, based on the received merchant profile and user profile, product message(s) for communication to the user device; and communicate the product message(s) to the user device.

20 Claims, 10 Drawing Sheets

(56) References Cited

U.S. PATENT DOCUMENTS

| | | | |
|---|---|---|---|
| 10,242,384 B2* | 3/2019 | Otis | G06Q 30/0217 |
| 10,552,868 B1* | 2/2020 | Kim | G06Q 30/0222 |
| 2004/0034723 A1* | 2/2004 | Giroti | H04L 12/66 |
| | | | 710/8 |
| 2004/0162059 A1* | 8/2004 | Hiltunen | H04W 12/033 |
| | | | 455/41.2 |
| 2004/0254834 A1* | 12/2004 | Wohlers | G06Q 30/0257 |
| | | | 705/14.55 |
| 2005/0234771 A1* | 10/2005 | Register | G06Q 30/0226 |
| | | | 705/14.27 |
| 2006/0085049 A1* | 4/2006 | Cory | A61B 5/4041 |
| | | | 607/48 |
| 2007/0038614 A1* | 2/2007 | Guha | G06Q 30/02 |
| 2007/0073799 A1* | 3/2007 | Adjali | H04L 67/306 |
| | | | 709/200 |
| 2008/0215436 A1* | 9/2008 | Roberts | G06Q 30/0255 |
| | | | 705/14.1 |
| 2009/0106099 A1* | 4/2009 | Chow | G06Q 30/02 |
| | | | 705/40 |
| 2010/0057639 A1* | 3/2010 | Schwarz | G06Q 30/0283 |
| | | | 705/400 |
| 2011/0026697 A1* | 2/2011 | Vanier | H04M 3/4878 |
| | | | 379/218.01 |
| 2011/0029370 A1* | 2/2011 | Roeding | G01S 5/0257 |
| | | | 705/14.38 |
| 2011/0143779 A1* | 6/2011 | Rowe | H04M 3/42348 |
| | | | 455/456.3 |
| 2011/0202881 A1* | 8/2011 | Singh | G06Q 30/02 |
| | | | 715/833 |
| 2011/0295692 A1* | 12/2011 | Zivkovic | G06Q 30/0261 |
| | | | 705/14.58 |
| 2012/0022776 A1* | 1/2012 | Razavilar | G01C 21/3697 |
| | | | 707/769 |
| 2012/0311328 A1* | 12/2012 | Wang | H04L 9/3271 |
| | | | 713/168 |
| 2014/0006141 A1* | 1/2014 | Vassilvitskii | G06Q 30/0275 |
| | | | 705/14.71 |
| 2014/0006161 A1* | 1/2014 | Jabara | H04L 67/20 |
| | | | 705/14.57 |
| 2014/0214547 A1* | 7/2014 | Signorelli | G06Q 30/0267 |
| | | | 705/14.64 |
| 2014/0358666 A1* | 12/2014 | Baghaie | G06Q 30/0261 |
| | | | 705/14.58 |
| 2015/0019326 A1* | 1/2015 | Russell | G06Q 30/0255 |
| | | | 705/14.45 |
| 2015/0063472 A1* | 3/2015 | Chatterton | H04W 4/18 |
| | | | 375/256 |
| 2015/0066742 A1* | 3/2015 | Chatterton | G06Q 20/3224 |
| | | | 705/39 |
| 2015/0170256 A1* | 6/2015 | Pettyjohn | G06Q 30/0603 |
| | | | 705/26.9 |
| 2015/0242899 A1* | 8/2015 | Farhi | G06Q 30/0639 |
| | | | 705/14.58 |
| 2015/0248702 A1* | 9/2015 | Chatterton | G06Q 30/0261 |
| | | | 705/14.58 |
| 2015/0262117 A1* | 9/2015 | Li | G06Q 30/02 |
| | | | 235/385 |
| 2015/0362315 A1* | 12/2015 | Abdi | G01C 21/206 |
| | | | 702/150 |
| 2016/0019522 A1* | 1/2016 | Granbery | G06Q 20/227 |
| | | | 705/21 |
| 2016/0027073 A1* | 1/2016 | Eramian | H04W 4/025 |
| | | | 705/346 |
| 2016/0057184 A1* | 2/2016 | O'Brien | H04L 65/00 |
| | | | 709/205 |
| 2016/0105515 A1* | 4/2016 | Murdock | H04W 4/021 |
| | | | 715/716 |
| 2016/0125467 A1 | 5/2016 | Scott et al. | |
| 2016/0162938 A1* | 6/2016 | LeBeau | G06Q 30/0255 |
| | | | 705/14.53 |
| 2016/0165056 A1* | 6/2016 | Bargetzi | H04L 63/08 |
| | | | 455/416 |
| 2016/0189276 A1* | 6/2016 | Batra | G06Q 30/0633 |
| | | | 705/26.8 |
| 2016/0307181 A1* | 10/2016 | Syed | G06K 7/1404 |
| 2017/0061490 A1* | 3/2017 | Ghahremani | G06Q 30/0277 |
| 2017/0091823 A1* | 3/2017 | Adinarayan | H04W 4/029 |
| 2017/0093991 A1* | 3/2017 | Douglas | H04L 67/141 |
| 2017/0099575 A1* | 4/2017 | Schulz | H04W 76/14 |
| 2017/0164159 A1* | 6/2017 | Mycek | H04W 4/30 |
| 2017/0255915 A1* | 9/2017 | Chandrasekaran | G06Q 20/3224 |
| 2017/0300972 A1* | 10/2017 | Moon | G06Q 30/0261 |
| 2018/0063684 A1* | 3/2018 | Cheng | H04L 51/20 |

OTHER PUBLICATIONS

ShopAssist—A Unified Location-Aware System for Shopping; Lopes et al., 2016 Global Information Infrastructure and Networking Symposium (GIIS) (pp. 1-6) for shopassist.*

International Search Report and Written Opinion dated Jun. 19, 2018 in International Patent Application No. PCT/AU2018/050249. 15 pages.

* cited by examiner

SYSTEM AND METHOD FOR PROVIDING INFORMATION

CROSS-REFERENCES TO RELATED APPLICATIONS

This application is a continuation application of International Patent Application No. PCT/AU2018/050249 entitled "SYSTEM AND METHOD FOR PROVIDING INFORMATION," filed on Mar. 19, 2018, which claims priority to Australian Patent Application No. 2017901317, filed on Mar. 24, 2017, each of which are herein incorporated by reference in their entirety for all purposes.

FIELD OF THE INVENTION

The invention generally relates to presenting location relevant messages to a user, for example, personalised advertisements etc.

BACKGROUND OF THE INVENTION

It is known to provide online targeted advertisements to users, for example when the user searches for a product using a web browser and a search engine. However, such online advertising can be at the expense of so-called "brick and mortar" shops—i.e. where a customer is required to be physically present to peruse products and make purchases.

There is a need to provide engagement and interest between merchants and potential customers. Such engagement can assist in increasing sales and providing an overall better experience to customers.

SUMMARY OF THE INVENTION

According to an aspect of the present invention, there is provided messaging system comprising: a user device configured to: receive, via a local wireless channel, a beacon ID from a local beacon device when within a communication distance of the local beacon device; communicate, via a network, information enabling a merchant database to identify a merchant profile associated with the local beacon device in response to receiving the beacon ID; and receive, via the network, one or more product messages for presentation via a user interface of the user device, the merchant database comprising one or more merchant profiles, each merchant profile comprising data entries associated with one or more products, a user database comprising one or more user profiles, a comparison server configured to: receive from the merchant database a merchant profile associated with a beacon ID obtained by the user device and a user profile associated with the user device from the user database; identify, based on the received merchant profile and user profile, at least one product message for communication to the user device; and communicate the at least one product message to the user device via the network.

Typically, the user device is a smartphone. Preferably, the local wireless channel comprises Bluetooth Low Energy.

The system preferably further comprises one or more local beacon devices. The beacon ID is stored in a memory of the, or each, local beacon device.

Optionally, each merchant profile includes one or more products provided by a merchant associated with the merchant profile. Also optionally, each user profile includes products determined to be of interest to a user associated with the user profile. The at least one product message may be associated with a product present in both the received user profile and the received merchant profile. Optionally, the comparison server is configured to select the at least one product message randomly. Each user profile may include a plurality of hierarchical categories, each associated with at least one item, and the comparison server may be configured to select the at least one product message in accordance with items determined to be of relevance to the user. Preferably, the comparison server is configured to select the at least one product message in accordance with a bidding procedure.

The user device may be configured to present a notification that a product message has been received, and may be configured to present the product message via a user interface.

The system preferably further comprises a user tracker configured to update a user profile of a user in response to online searching activities of the user. The online searching activities may comprise using a smartphone application or web application, and the user may tracker receive information from the relevant application on the user's searching behaviour.

According to another aspect of the present invention, there is provided a method for providing a message to a user, comprising: a user device: receiving, via a local wireless channel, a beacon ID from a local beacon device when within a communication distance of the local beacon device; communicating, via a network, information enabling a merchant database to identify a merchant profile associated with the local beacon device in response to receiving the beacon ID; and receiving, via the network, one or more product messages for presentation via a user interface of the user device.

Optionally, the method further comprises: maintaining the merchant database comprising one or more merchant profiles, each merchant profile comprising data entries associated with one or more products; maintaining a user database comprising one or more user profiles; and a comparison server: receiving from the merchant database a merchant profile associated with a beacon ID obtained by the user device and a user profile associated with the user device from the user database; identifying, based on the received merchant profile and user profile, at least one product message for communication to the user device; and communicating the at least one product message to the user device via the network.

According to another aspect of the present invention, there is provided a virtual marketplace system comprising: a virtual marketplace module configured to: generate a virtual store rendering including one or more product set images, wherein each product set image is associated with one or more products, and generate a virtual product list in response to a user selection of a product set image, wherein the virtual product list comprises information of the, or each, product associated with the selected product set image; a virtual interactive device configured to: display the virtual store rendering to a user of the virtual interactive device, provide selection mechanism by which the user can select a product set image included within the virtual store rendering, and display the virtual product list generated in response to selection of an associated product set image by the user.

In an embodiment, the selection mechanism includes a visual selection mechanism configured to: identify a viewing direction of the user; determine that the user is viewing one of the one or more product set images based on the identified viewing direction; and, in response, to determine that the user has selected said identified product set image. Optionally, the user viewing determiner utilises orientation data obtained from an orientation sensor of the virtual interactive device. A product set image may be required to be viewed for a predetermined dwell time in order to indicate selection. The virtual interactive device may be configured to display an animation indicating a remaining time before a product set image is determined to be selected.

Optionally, each product set image is associated with a category, and the product list associated with a product set image is generated at least in part in accordance with the category associated with the product set image.

Optionally, the messaging system further comprises a user database comprising one or more user profiles, wherein the virtual marketplace module is in communication with the user database and is configured to: identify a user profile within the user database associated with the user of the virtual interactive device; obtain one or more products determined to be of interest to the user from the identified user profile; and generate the product list at least in part in accordance with the obtained one or more products.

Optionally, the messaging system further comprises a merchant database comprising one or more merchant profiles, wherein the virtual marketplace module is in communication with the merchant database and is configured to: identify a merchant profile within the merchant database associated with the selected product set image; obtain one or more products associated with the merchant profile; and generate the product list at least in part in accordance with the obtained one or more products.

The virtual interactive device may be a smartphone. In this case, the virtual marketplace module may be implemented as a program executed by the smartphone. Alternatively, the virtual marketplace module may be implemented as a program executed by a marketplace server in communication with the smartphone.

Optionally, the virtual marketplace module is further configured to generate a virtual store-selection rendering including a plurality of store images, each store image associated with a virtual store rendering, the virtual interactive device is further configured to display a rendering of the virtual store-selection rendering to a user of the virtual interactive device and provide a selection mechanism by which the user can select a store image included within the virtual market rendering, and in response, generate the virtual store rendering in accordance with the selected store image.

According to yet another aspect of the present invention, there is provided a method for providing a virtual marketplace comprising: generating a virtual store rendering including one or more product set images, wherein each product set image is associated with one or more products, and generating a virtual product list in response to a user selection of a product set image, wherein the virtual product list comprises information of the, or each, product associated with the selected product set image; displaying on a virtual interactive device the virtual store rendering, providing a selection mechanism by which the user can select a product set image included within the virtual store rendering, and displaying the virtual product list generated in response to selection of an associated product set image by the user.

According to still yet another aspect of the present invention, there is provided a system comprising the messaging system and the virtual marketplace system of the previous aspects.

As used herein, the word "comprise" or variations such as "comprises" or "comprising" is used in an inclusive sense, i.e. to specify the presence of the stated features but not to preclude the presence or addition of further features in various embodiments of the invention.

BRIEF DESCRIPTION OF THE DRAWINGS

In order that the invention may be more clearly understood, embodiments will now be described, by way of example, with reference to the accompanying drawing, in which.

DESCRIPTION OF EMBODIMENTS

Figure 1:
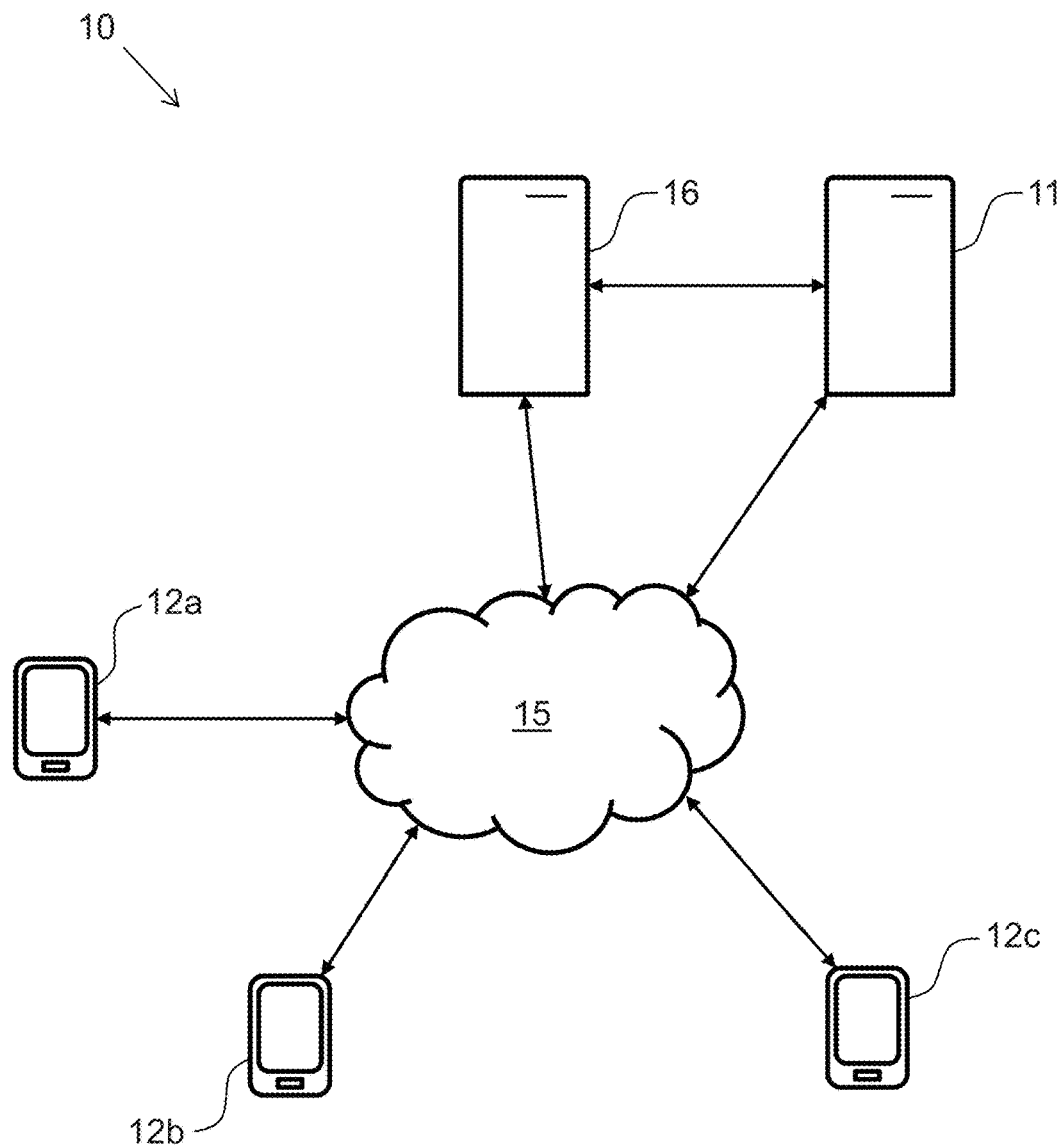
FIG. 1 shows a messaging system according to an embodiment.
Figure 1:
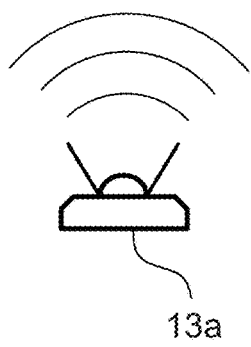
Figure 1:
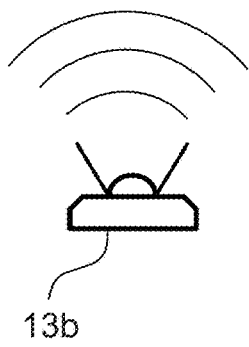

FIG. 1 shows a messaging system 10 according to an embodiment, comprising an identification server 11 in communication with a plurality of user devices 12a-12c. In the present embodiment, the identification server 11 communicates with the user devices 12a-12c via a network 15, which typically includes the Internet. Although three user devices 12a-12c are shown, generally the system 10 can comprise one or more user devices 12. The system 10 further comprises one or more local beacon devices 13 (two local beacon devices 13a, 13b are shown). The local beacon devices 13 are configured to communicate via a local channel 81 with user devices 12 which are present within a communication range. The communication range (for communication via the local channel 81) is typically less than 50 metres, for example less than 25 metres and preferably approximately 10 metres or less. The local channel 81 is a wireless communication channel, for example employing the Bluetooth Low Energy standard. Also shown is a comparison server 16, in communication with the network 15. The comparison server 16 is also interfaced with the identification server 11 (either directly or via network 15).

The user devices 12, according to an embodiment, implement programmable computing functionality and are portable (in the sense that, the user device 12 may be carried by a person with ease). For example, a user device 12 may be a smartphone or other portable computing device implementing computer software (such as a downloaded application, sometimes referred to as an "app") enabling the functionality described herein. The user devices 12 include a local wireless module for enabling communication via the local channel 81 with the local beacon devices 13 and a network communication module for enabling communication with the network 15, for example via one or both of a WiFi connection (e.g. IEEE 802.11) and a mobile data connection (e.g. 3G or 4G, such as LTE).

Figure 2:
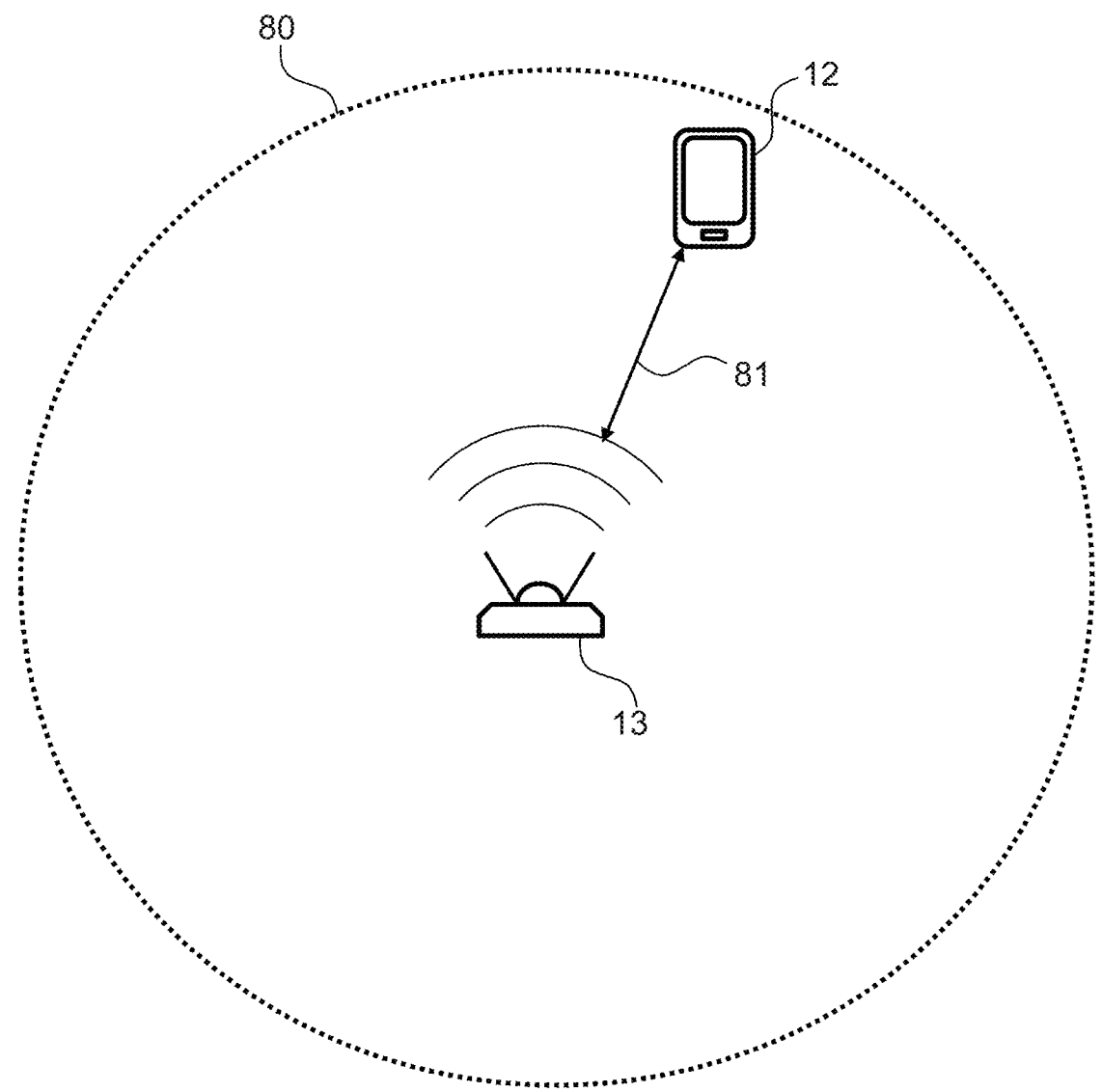
FIG. 2 shows a user device within a communication distance of a local beacon device.

FIG. 2 shows an illustration of a user device 12 being within communication range via the local channel 81 (the communication range is represented by dotted line 80) with a local beacon device 13. The user device 12 receives, via the local channel 81, a beacon ID of the local beacon device 13. Generally, each local beacon device 13 is associated with a beacon ID which is configured to allow identification of the local beacon device 13 and is preferably uniquely associated with the local beacon device 13. The beacon ID may be a unique number recorded into a memory of the local beacon device 13 at manufacture. For example, the beacon ID may be a MAC address.

In response to receiving a beacon ID from a local beacon device 13, each user device 12 is configured to communicate information to the identification server 11 via the network 15 enabling the identification server 11 to identify the local beacon device 13. Typically, this information will comprise or is generated from the beacon ID. For the purposes of this disclosure, it is assumed that the beacon ID is communicated to the identification server 11. It may be preferred that the user devices 12 are configured to communication the information without requiring an additional user input (i.e. "automatically"), however, an embodiment may require that a user interacts with their user device 12 to authorise the communication.

Figure 3:
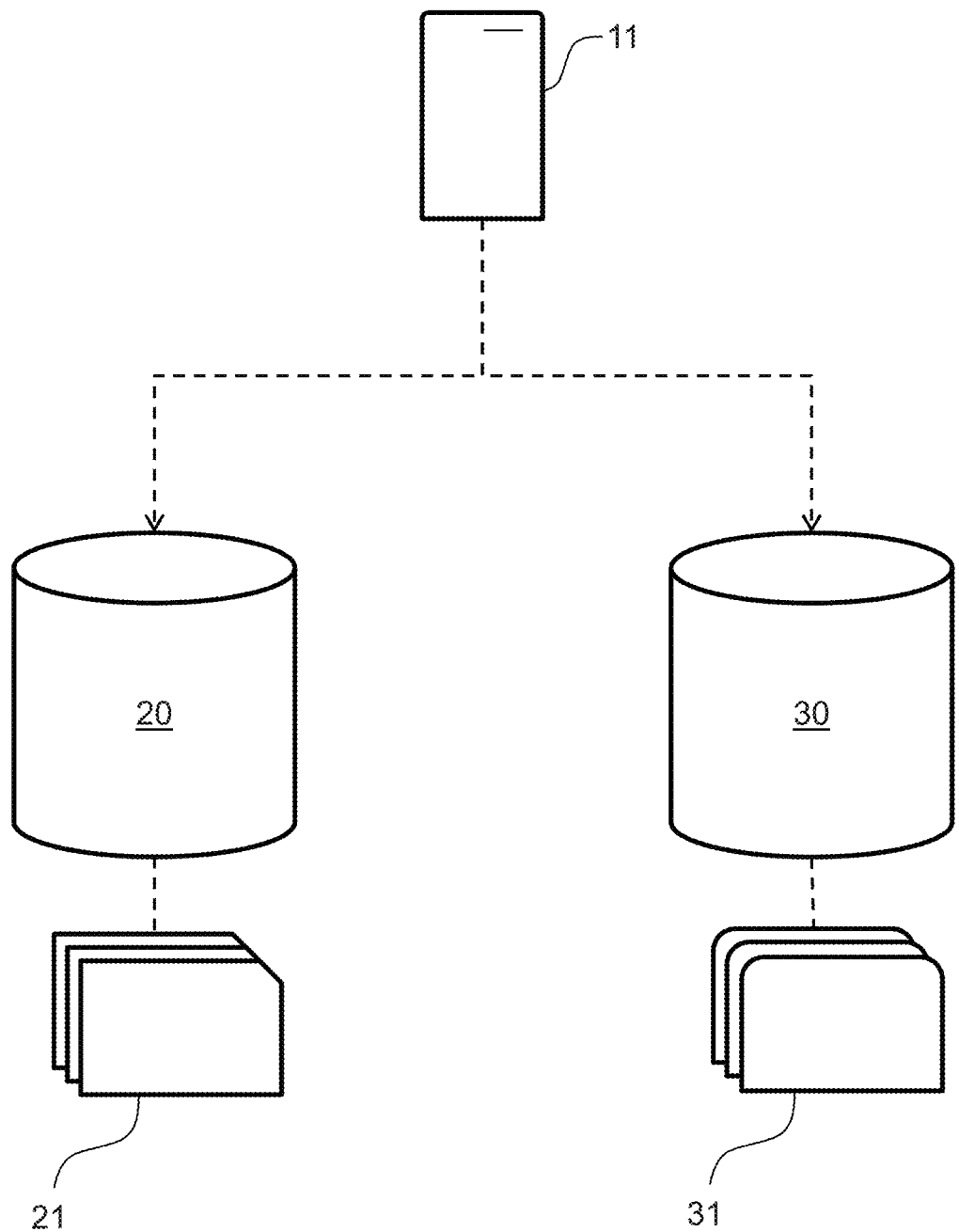
FIG. 3 shows a user database and a merchant database.

Referring to FIG. 3, the identification server 11 is configured to maintain a user database 20 comprising database entries corresponding to a user profile 21 for each of one or more users (i.e. each database entry corresponds to a user profile 21). Each user device 12 is associated with a user, and therefore, a user profile 21. Generally, there may be more than one user device 12 associated with a user profile 21 (e.g. a user having more than one user device 12). The identification server 11 is configured to identify a user profile 21 associated with a user device 12 when a beacon ID is communicated to the identification server 11 from the user device, within the user database 20.

Referring still to FIG. 3, the identification server 11 is also configured to maintain a merchant database 30 comprising database entries corresponding to a merchant profile 31 for each of one or more merchants (i.e. each database entry corresponds to a merchant profile 21). Each local beacon device 13 is associated with a merchant. The identification server 11 is configured to identify a merchant profile 31 associated with a received beacon ID within the merchant database 30.

Generally, the functionality of each of the identification server 11 and the comparison server 16 may be implemented in a standalone computing device, a multi-processor computing device, and interlinked plurality of computing devices such as provided by a cloud service provider, or any other suitable configuration for implementing the functionality herein described. Furthermore, although the identification server 11 is described as maintaining a number of databases, in an alternative embodiment the user database 20 is maintained by a physically and/or logically distinct server to the merchant database 30.

Figure 4:
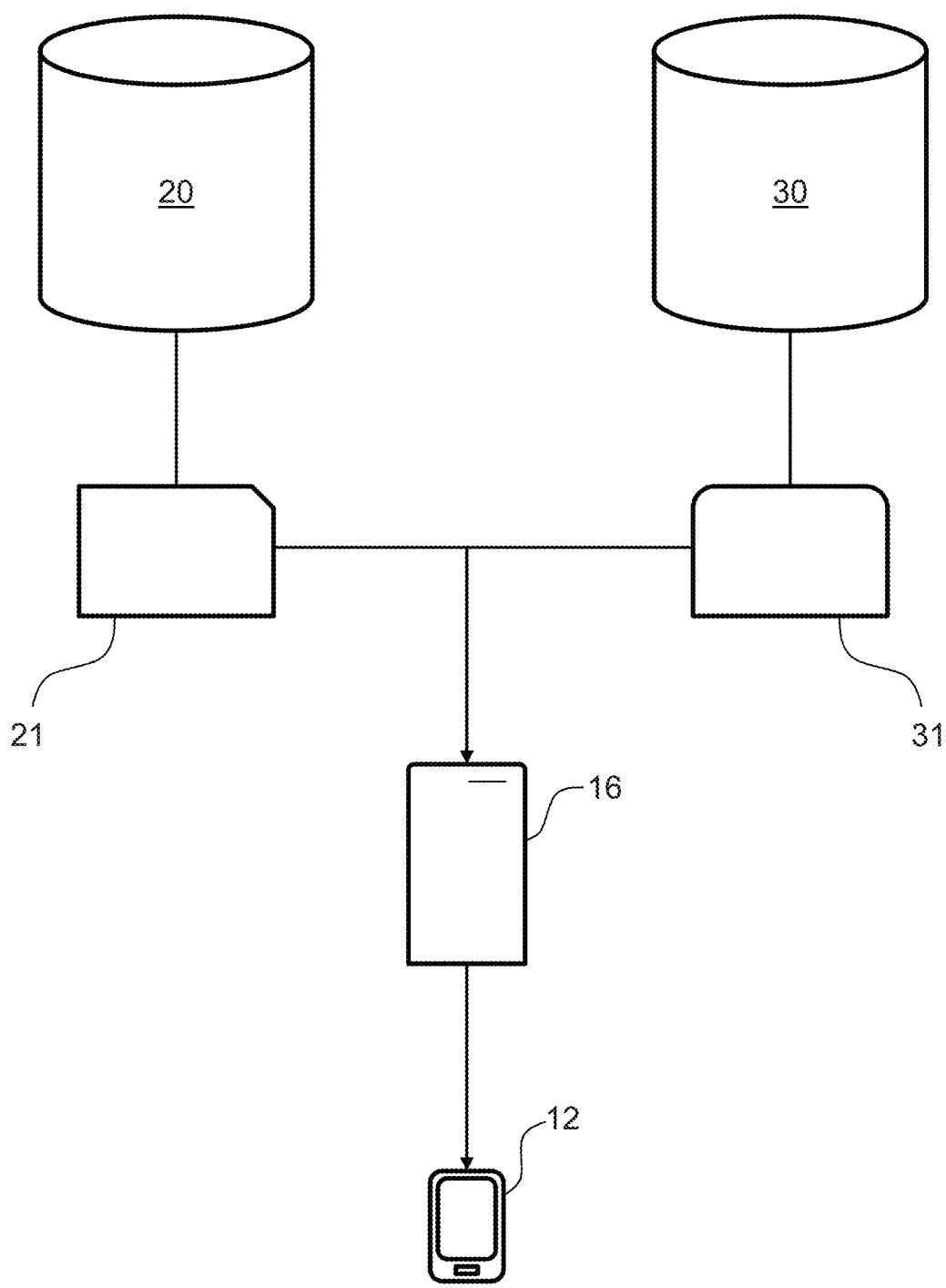
FIG. 4 shows a comparison server receiving a user profile and a merchant profile.

Referring to FIG. 4, the comparison server 16 is configured to receive the identified merchant profile 31 and the identified user profile 21 from the merchant database 30 and user database 20, respectively. The comparison server 16 is further configured to, in response, identify one or more product messages to communicate to the respective user device 12 based on the identified merchant profile 31 and user profile 21. The comparison server 16 can be implemented within the same hardware as the identification server 11 (but may optionally be logically distinct), or can be implemented in different hardware with a data connection (optionally via network 15) allowing communication between the two servers 11, 16.

A product message is typically associated with a product offered by the merchant associated with the beacon ID (and therefore, the identified merchant profile 31). In one example, the product message is an advertisement for the product. In another example, the product message is an advertisement for a collection of items which include the product.

The one or more identified product messages are communicated to the user device 12 via the network 13. The user device 12 is typically configured to provide a notification to the user of the user device 12 in response to receiving the media content. The user may then interact with the user device 12 in a known manner (such a via a touch screen user interface) in order to acknowledge the notification and cause the media content to be displayed on a display of the user device 12. The product messages generally can comprise one or more of: text, images, sound, etc. In an alternative embodiment, the product messages are displayed without presenting a notification.

In this way, the user device 12 is configured to cause product messages to be presented to the user in response to communication with the local beacon device 13. The user therefore receives one or more product messages when in proximity with the physical location of the merchant. It is preferred that the product messages are delivered in "real-time"; that is, without a noticeable delay to the user.

The user tracker is configured to identify, based on actions of a user, products that may be of interest to the user. In an embodiment, the user tracker is implemented as a searching application through which the user directly interacts, for example as one or both of a smartphone "app" or as a web application. In both cases, the user is enabled to login to the searching application, such that the user tracker is able to associate activities undertaken by the user through the searching application with the user profile 21 of the user. In another embodiment, the user tracker is interfaced to third party applications (such as web applications and smartphone apps). The third party applications provide for the user to search for products of interest. The user tracker is configured to receive information on such searching of the user from the third party application. In another embodiment, the user may install a separate monitoring application onto a device (such as a personal computer or smartphone), which monitors searching of the user. Generally, any one or more of these embodiments may be employed, and further embodiments in which searching by a user is monitored.

Generally, a user is enabled to search for products of interest to the user, and the user tracker is configured to record products that may be of interest into the user profile 21 associated with the user. The user may be enabled to provide an explicit indication of products of interest, for example, by marking a product as a "favourite". This action is then identified by the user tracker, which then associates the product with the user profile 21 (i.e. the product is recorded as a "linked product" in the user profile 21 associated with the user). Alternatively, or in addition, the user tracker is configured to infer products that may be of interest to the user through searching actions of the user. For example, if a user undertakes an action to obtain further detail of a product, this action may be recorded into the user profile 21. In another example, the purchase of a product by a user may be recorded into the user profile 21.

According to an implementation, one or more of the following user trackers may be utilised: online via website & app provided by a system operator; in-store interactions which may be recorded through interaction between the user device 12 and the local beacon device 13, for example, the user device may be configured to communicate with the user tracker information such as time in the vicinity of the local beacon device 13; online analytics, for example, utilising Google Analytics; and interactions by a user with product messages received at a user device 12.

Each merchant profile 31 comprises one or more products identifiers. The merchant associated with the merchant profile 31 provides products which may be purchased. Each product identifier is associated with a product available at the merchant. The merchants may each be associated with physical locations; for example, the physical location is a "bricks and mortar" store or the like where a customer is able to be physically present.

In an embodiment, a merchant or an agent of the merchant (herein, both are referred to interchangeably as the "merchant") is enabled to record into the merchant database products available for purchase at their premises. For example, the merchant may use a computer to access, via the network 15, the identification server 11 (for example, by accessing a web application via a web browser, or by utilising a smartphone app). The merchant can then record database entries corresponding to one or more of the products available for purchase within the merchant profile 31 associated with the merchant.

In an embodiment, the merchant database 30 is in communication with an image database (not shown). The image database comprises one or more entries corresponding to product profiles. Each product profile comprises information relating to a product, typically including image and/or virtual rendering information for generating a visual representation of the product. The product profile may also comprise information on the product (e.g. manufacturer). In an implementation, when a merchant profile is updated to include a new product, the information on that product is obtained by the merchant database 30 from the product database. In another implementation, when information on a product is required for presentation to a user of a user device 12, the information is obtained from the product database. The product database may be obtained by a separate product manager, for example a user with authorisation to manage the product database. The information may at least in part be automatically obtained via the network 15 (e.g. via scraping of relevant Internet website(s)).

Figure 5:
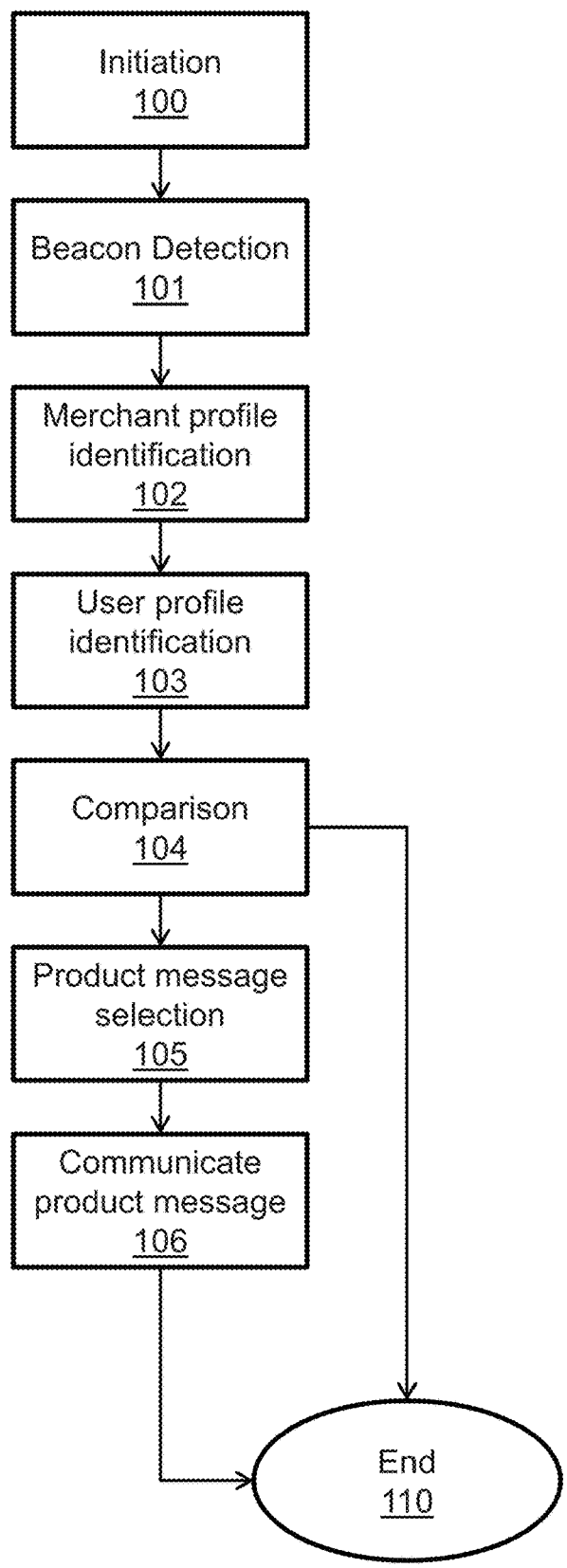
FIG. 5 shows a method for selecting a product message.

Referring to FIG. 5, a method is shown whereby a message comprising one or more product messages is communicated to a user device 12 in response to the user device 12 communicating with a local beacon device 13. The user device 12 is initiated at initiation step 100. The user may cause the user device 12 to initiate by, for example, instructing the user device 12 to begin running software providing the functionality described herein. The user device 12 may also be initialised simply by having thereon software implementing the functionality described herein (i.e. the user device 12 is initialised whenever powered on).

When within a communication distance of a local beacon device 13, the user device 12 is configured to determine that communication with the local beacon device 13 is possible via the local channel 81, and beacon detection step 101. For example, the local beacon device 13 may periodically (for example, every one second, although any suitable period may be employed) broadcast a broadcast message indicating its presence. When within range, the user device 12 is able to detect the broadcast message, and may then communicate with the local beacon device. In an embodiment, the broadcast message comprises the beacon ID of the local beacon device 13 and the user device 12 is not required to transmit data to the local beacon device 13. In another embodiment, the user device 12 is required to communicate data corresponding to an enquiry to the local beacon device 13, to which the local beacon device 13 is configured to respond with its beacon ID. Generally, the beacon detection step 101 results in the user device 12 obtaining the beacon ID of the local beacon device 13.

The user device 12 then communicates the beacon ID (or at least, information from which the beacon ID can be derived) to the identification server 11, such that the merchant profile 31 associated with the beacon ID can be identified within the merchant database 30, at merchant profile identification step 102. The user device 12 typically also communicates a user identifier enabling identification of the user profile 21 associated with the user device 12 to the identification server 11, thereby enabling identification of the relevant user profile 21 within the user database 20, at user profile identification step 103.

The comparison server 16 obtains the identified merchant profile 31 and the identified user profile 21, and undertakes a comparison in order to identify one or more product messages to communicate to the user device 12 associated with the merchant profile 31 and user profile 21, at comparison step 104.

In an embodiment, the comparison server 16 attempts to identify one or more products that have been associated with the identified user profile 21 which are also present in the identified merchant profile 31. If it is successful, then the method proceeds to product message selection step 105 (described below). If it is unsuccessful, then according to this embodiment no product message is selected and the method proceeds to end step 110.

In another embodiment, the comparison server 16 utilises user categories associated with the user profile 21 and/or product categories associated with merchant profile 31 in order to identify one or more product messages for selection at product message selection step 105.

Figure 6:
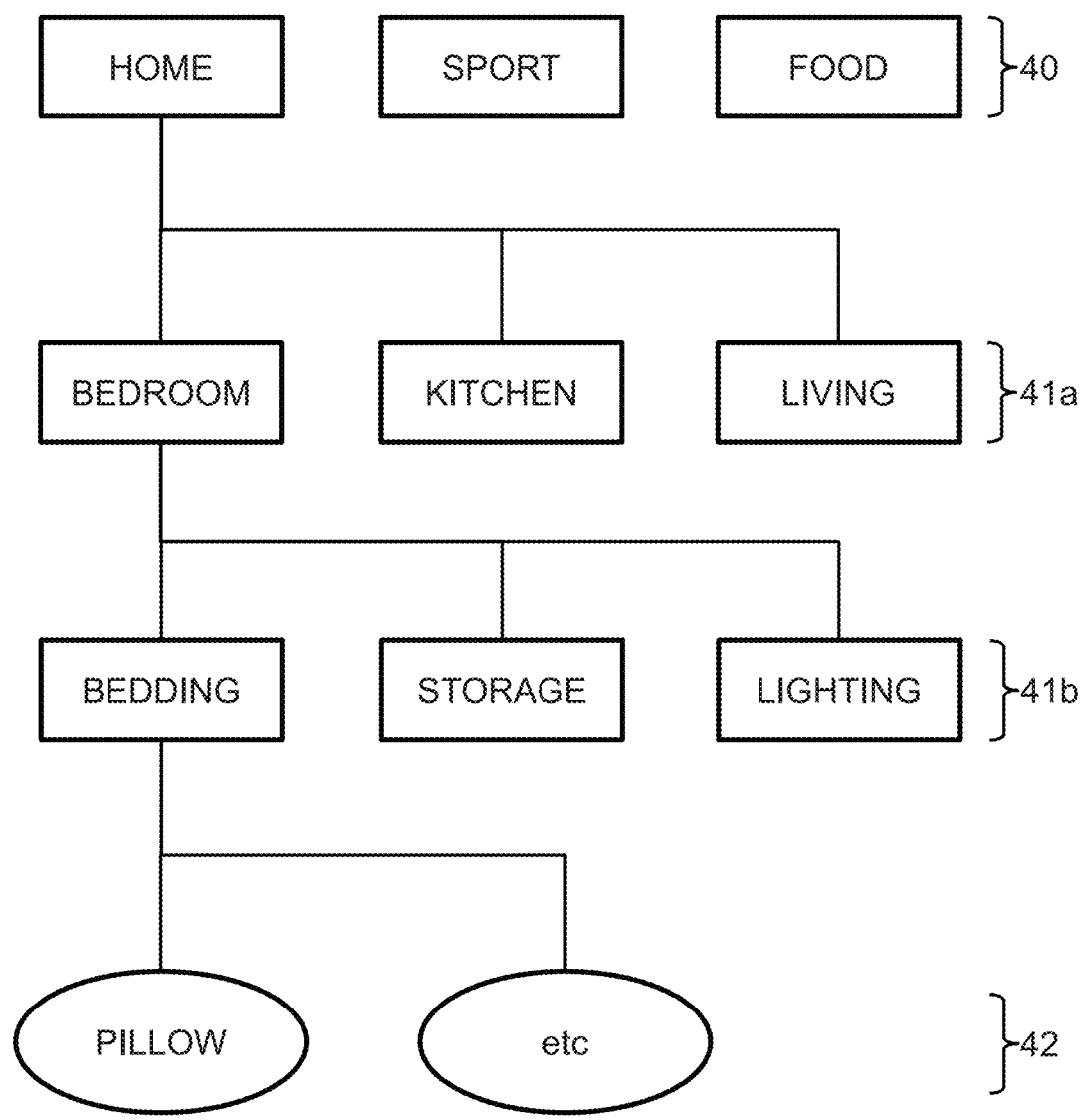
FIG. 6 shows a hierarchical structure of categories and items.

Referring to FIG. 6, a user profile 21 can be associated with a plurality of user categories 40, 41, 42, each category associated with one or more items. Each user category 40, 41, 42 provides information on the user associated with the user profile 21. The user categories 40, 41, 42 are arranged in a hierarchical manner, the example shown including a first user category 40, being a "top-level" or "major" category, optionally one or more second user categories 41, being "sub" categories related to the major category, and a product user category 42. In the example shown, there are two second categories 41a, 41b, with second category 41a located under the first category 40 and second category 41b located under second category 41b. Generally, there can be as many second categories as required. The product category 42 is effectively located under the lowest of the second categories 42 (in the example, second category 41b).

The purpose of the user categories 40, 41, 42 is to enable a product message (or product messages) to be identified that are likely to be of interest to the user. For a user profile 21, the user categories 40, 41, 42 are populated in accordance with the user behaviour as recorded by the user tracker.

In the example shown, the first user category 40 comprises three items, namely "home", "sport", and "food". In the example, the second user category 41a associated with the home item is shown. As can be seen, there are several items in this category 41a, including "bedroom", "kitchen", and "living". In the example, the second user category 41b associated with the bedroom item is shown. Here, as can be seen, are several items, including "bedding", "storage", and "lighting". Finally, under the item bedding in second category 41b is shown a number of products within the associated product category 42.

For each category 40, 41, 42 there are a collection of associated items, with each item having a sub-category associated with it (except in the case of product category 42). Based on the information obtained by the user tracker, information is recorded in the user profile 21 of a user indicating which items within each user category 40, 41, 42 may be of interest to the user. For example, if the user has searched online for "pillow", and this has been identified by the user tracker, then the item "home" in the first user category 40 is updated to include an indication that the user has an interest in "home" products. Further, the item "bedroom" in the second category 41a is also updated to include an indication that the user has an interest in "bedroom" products. Additionally, the item "bedding" in the second category 41b is also updated to include an indication that the user has an interest in "bedding" products. Finally, the actual item of "pillow" is updated in the corresponding product category 42.

The example shown is illustrative. Generally, the user categories 40, 41, 42 can be configured as desired, for example, by an operator of the identification server 11 and comparison server 16. Furthermore, the items present in each user category 40, 41, 42 can be configured as desired. An operator may be enabled to utilise a computing device (for example, one in communication with the Internet) to configured to user categories 40, 41, 42 and the items present in each user category 40, 41, 42. The number of user categories 40, 41, 42 may be configured by the operator.

A product message according to an embodiment is selected in dependence of an identified user profile 21 and an identified merchant profile 31. Each product associated with the identified merchant profile 31 is compared to the user profile 21, in order to identify items associated with the user profile 21 associated with the product. For example, if the product is a "pillow", then considering the example of FIG. 7, item "home" from the first user category 40, item "bedroom" from second user category 41a, item "bedding" from second user category 41b, and item "pillow" from product user category 42 are identified. In another example, if the product were a "valance" (which it is assumed has not directly been associated with an item in the product user category 42 of the user profile 21), then only items "home" from the first user category 40, "bedroom" from second user category 41a, "bedding" from second user category 41b are identified.

In order for the comparison to be effective, each product should be identifiable with a user category 40, 41, 42. This can be achieved, for example, by the operation of an operator responsible for managing information on products (which may be the merchant when configured their associated merchant profile 31 or another entity). In an embodiment, the operator is enabled to add products to a merchant profile 31, and when doing so, associate each product with various user categories 40, 41, 42 and items. The operator may be enabled to define new items and/or user categories 40, 41, 42.

A product message is then selected. Generally, there can exist one, or one or more, product messages associated with each product of the merchant profile 31. Each product message is effectively scored based on the matching items from the user profile 21. Generally, a "higher" score will be assigned to product messages associated with a product that matches an item in a "lower" category 40, 41, 42. In the previously described examples, product messages associated with "pillows" would score higher (as "pillow" is an item in the lowest category, namely product user category 42) than product messages associated with "valances" (as the lowest category matching "valance" is second user category 41b). In an embodiment, each product can be associated with multiple items in a category 40, 41, 42. For example, "pillow" may also be associated with the "living" item in second user category 41a. The score associated with each product message may also depend on the number of matching items in each category 40, 41, 42. The term "higher" in respect of a score is not intended to be limiting—scoring can be undertaken as desired.

In an embodiment, a product message is selected based on having a highest score. In the event of two or more product messages associated with the same highest score, a tie-breaker may be employed such as a random selection from the highest scoring product messages.

In another embodiment, a product message is selected in a semi-random manner, wherein the likelihood of a product message being selected is proportional to its score. That is, a product message associated with a product matching an item in a lower category 40, 41, 42 of the user profile is more likely to be selected than a product message associated with a product not matching an item is the same category 40, 41, 42.

In an embodiment, a product message is selected utilising a bidding technique. Here, each product message is associated with a provider (who may be the merchant or another entity), and the provider selects bidding parameters which act to potentially modify the probability of a particular product message being selected. In effect, a bidding technique is undertaken, with the highest bidder obtaining an increased chance of the associated product message being selected. The provider may be enabled to place a budget to limit the amount of successful highest bids that they can make. In effect, the probability of a product message being selected is proportional to the bid value selected by the provider.

In an embodiment, the product message is selected both in accordance with its score and in accordance with a bidding technique. In this embodiment, the probability of a product message being selected increases with a higher score (e.g. the product message is associated with a product of higher interest to the user) and with a higher bid value being selected by the provider.

In an embodiment, additional user information is utilised when selecting a product message. The additional user information may be in the form of user data associated with the user's user profile 21. Depending on the implementation, each product is either mandatorily or optionally associated with such additional user information. The additional user information is typically provided by the user (although additional information may be inferred). For example, additional user information can include one or more of: user's age; user's gender; user's occupation; user's income; etc. Each product or product message is associated can optionally (or mandatorily) comprise information indicating compatible additional user information. The product message can then be selected, generally in part, based on the product or product message matching the additional user information of the user.

The selected product message is communicated to the user device 12 which originally communicated the beacon ID to the identification server 11, at communicate product message step 106. The user device 12 is then typically configured to display a notification to the user of the user device 12, who is then enabled to view the product message (for example, by making a selection to "open" the product message).

The method then proceeds to end step 110.

Generally, the above embodiments may be modified to allow for one or more product messages to be selected and communicated to the user device 12.

Figure 10:
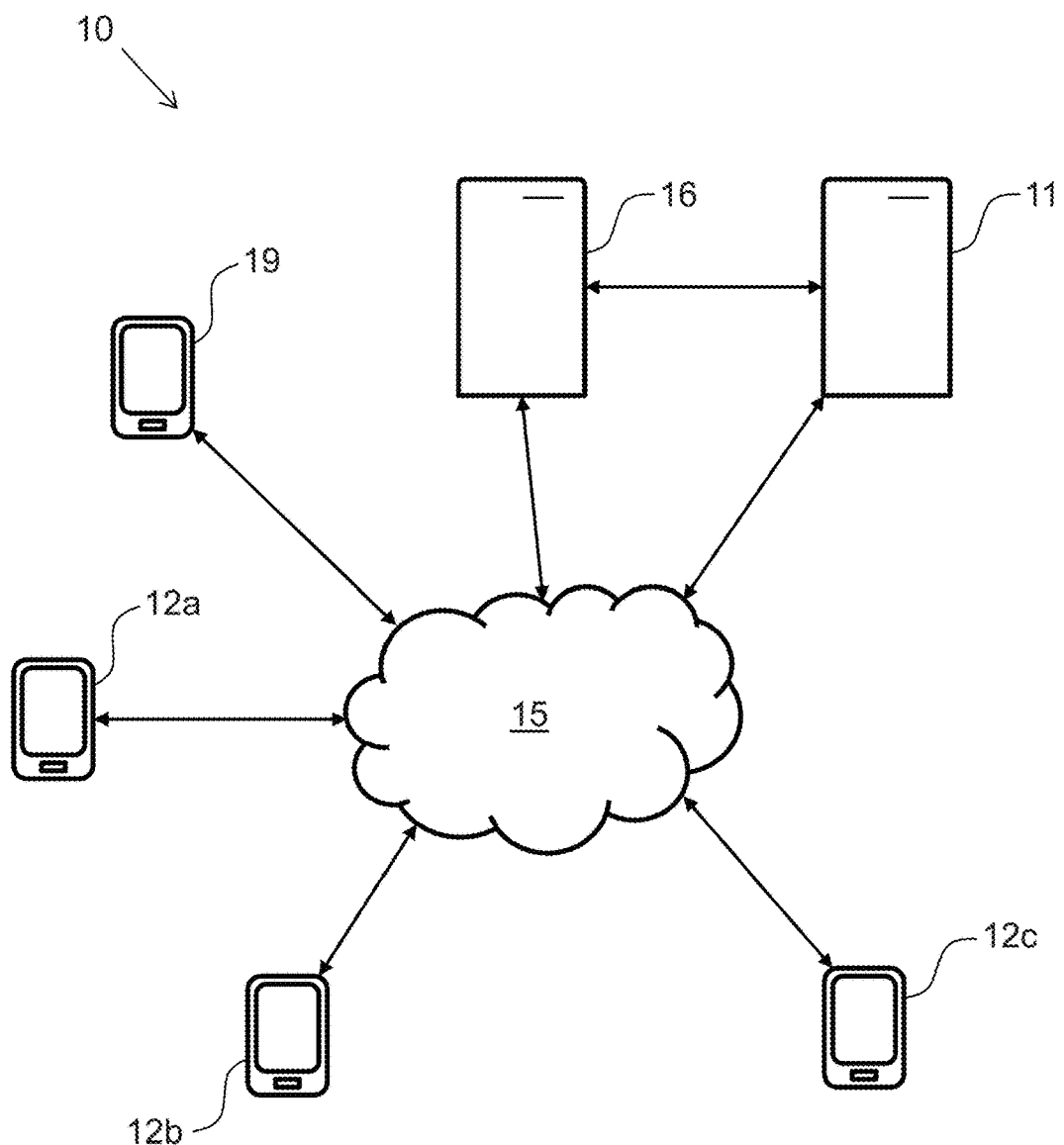
FIG. 10 shows an embodiment including a merchant device.
Figure 10:
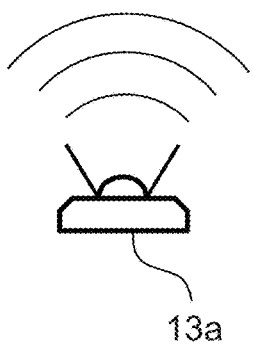
Figure 10:
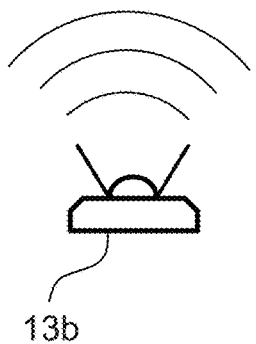

Referring to FIG. 10, in an embodiment, a representative of a merchant ("salesperson") is provided with a merchant device 19 (and therefore, the merchant device 19 is associated with a particular merchant and in turn, with a particular beacon ID). A merchant device 19, according to an embodiment, implements programmable computing functionality and is portable (in the sense that, the merchant device 19 may be carried by a person, such as the salesperson, with ease). For example, a merchant device 19 may be a smartphone or other portable computing device implementing software (such as a downloaded "app") enabling the functionality described herein. The merchant device 19 includes a network communication module for communication with the network 15, for example via one or both of a WiFi connection (e.g. IEEE 802.11) and a mobile data connection (e.g. 3G or 4G, such as LTE).

The identification server 11 is configured to communicate to the merchant device 19 associated with a received beacon ID. In this way, the merchant device 19 receives information indicating that a user is present at the merchant, the salesperson can then retrieve information on the user using the merchant device 19, via communication between the merchant device 19 and the user database 20. The merchant device 19 is configured to obtain information of products present at the merchant which may be of interest to the user. This typically involves interaction between the merchant device 19, user database 20, and merchant database 30. Typically, the merchant profile 31 of the merchant is compared with the user profile 21 of the user, and one or more relevant products identified and presented to the salesperson on the merchant device 19. In this way, the salesperson is provided with information enabling them to better serve the user, who may be a customer interested in purchasing one or more products located at the merchant's premises.

Figure 7:
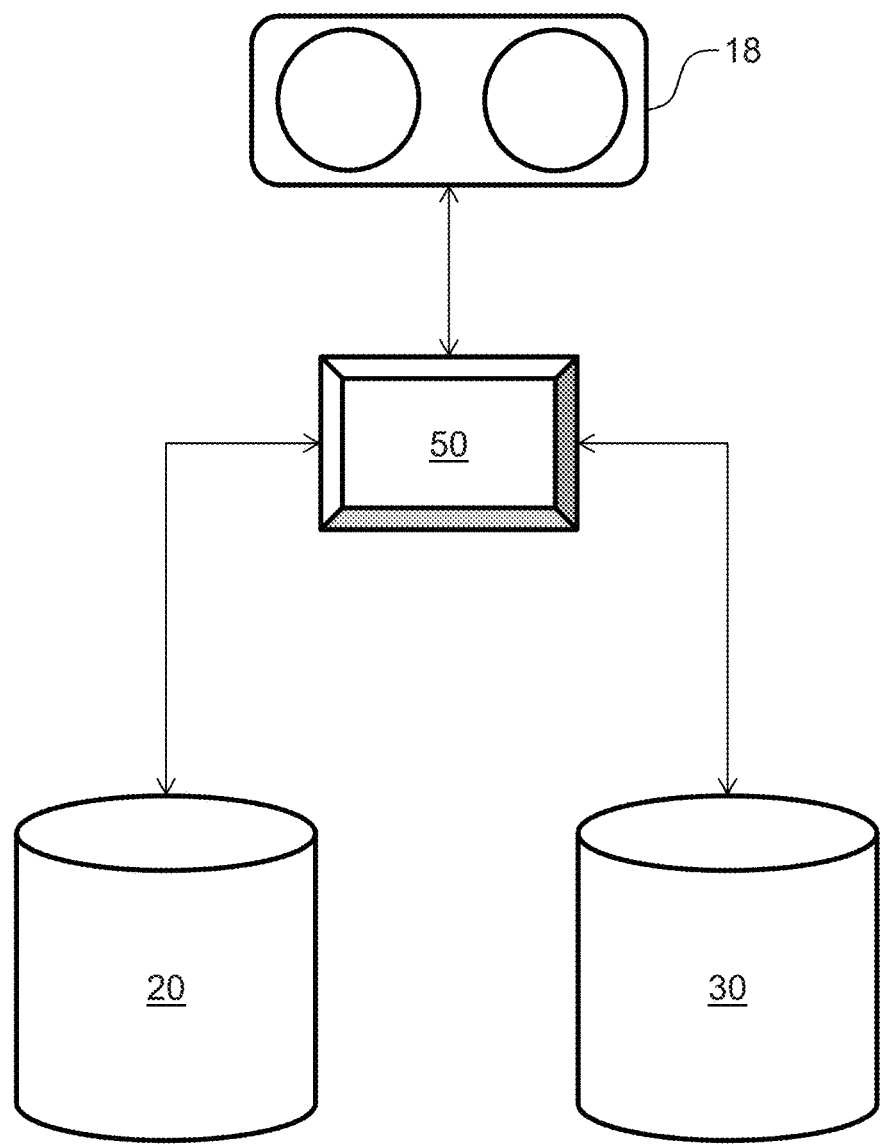
FIG. 7 shows a system comprising a virtual interactive device.

In an embodiment, as shown in FIG. 7, a virtual interactive device 18 is provided. The virtual interactive device 18 implements programmable computing functionality and is typically portable. For example, the virtual interactive device 18 can comprise a smartphone implementing software (such as a downloaded "app") enabling the functionality described herein. The virtual interactive device 18 typically includes a network communication module for communication with the network 15 (not shown in FIG. 7), for example via one or both of a WiFi connection (e.g. IEEE 802.11) and a mobile data connection (e.g. 3G or 4G, such as LTE). The virtual interactive device 18 may be implemented within the same hardware as a user device 12 (for example, a smartphone having software for implementing the functionality of a user device 12 and software for implementing the functionality of a virtual interactive device 18).

A virtual marketplace module 50 is interfaced with the virtual interactive device 18. In an implementation, the virtual marketplace module 50 is implemented as a feature of the virtual interactive device 18 (e.g. as a software module of the virtual interactive device 18). In another implementation, the virtual marketplace module 50 is implemented within separate computing hardware to the virtual interactive device 18, and is in data communication (for example, via the network 15).

The virtual marketplace module 50 is configured to receive data from the user database 20 and the merchant database 30, and may be in network communication with each. In an implementation, a product database is provided comprising entries corresponding to the entries of either or both of the user database 20 and the merchant database 30, and the virtual marketplace module 50 is in data communication (for example, network communication) with the product database (and thereby, receive data originating from, or equivalent to, the entries of either or both of the user database 20 and the merchant database 30).

The virtual interactive device 18 is configured to provide an interactive user experience to a user via a display, and is typically utilisable away from the physical merchant locations—for example, at the user's home or workplace. The virtual interactive device 18 can communicate with the user database 20 and merchant database 30 via network 15. A physical mounting device (such as a headset) may be provided for enabling viewing of virtual images presented on the display—for example, the physical mounting device may be "Google Cardboard". The physical mounting device is typically configured to ensure separate images are presented to each eye of the user, thereby creating a 3-dimensional "virtual image".

Figure 8:
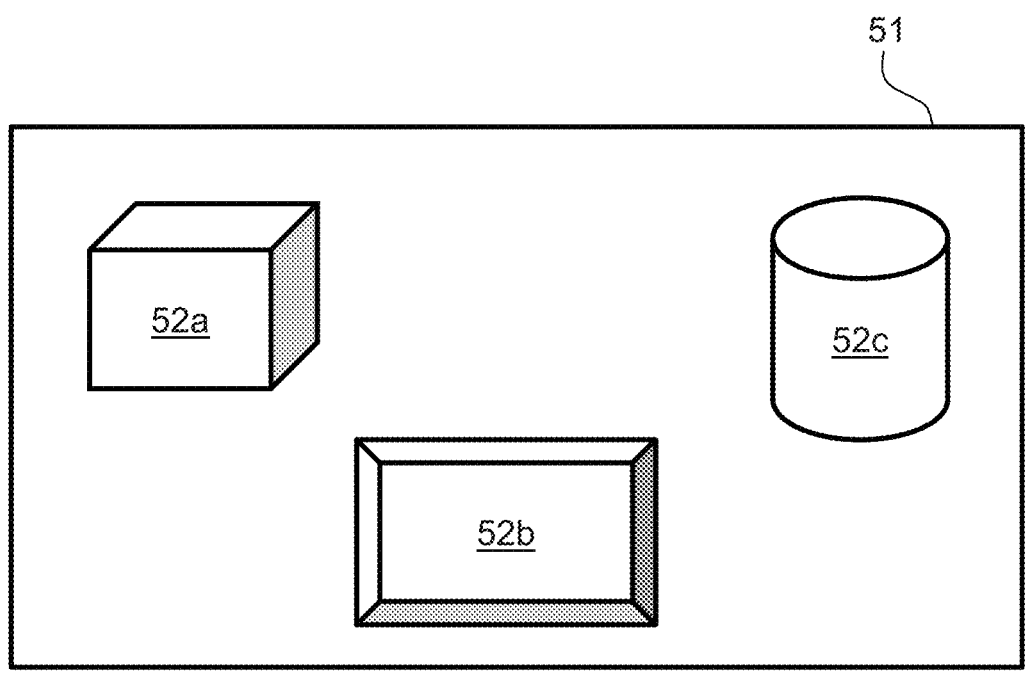
FIG. 8 shows a virtual store rendering displayed to a user.

With reference to FIG. 8, the virtual marketplace module 50 is configured to generate a virtual store rendering 51 for presentation on a display of the virtual interactive device 18. The virtual store rendering 51 corresponds to a virtual image, and provides an apparent 3-dimensional viewing effect. Additionally, the virtual image is configured to change due to motion of the user, typically motion of the user's head when the virtual interactive device 18 is worn on said head. The virtual store rendering 51 can provide a visual impression of a store, however, other impressions may be provided. The virtual store rendering 51 may be a 360 degree rendering.

The virtual store rendering 51 includes rendering of one or more product set images 52 (in FIG. 8, three product set images 52a, 52b, 52c are shown). Each product set image 52 takes up a "position" within the virtual store rendering 51, and is configured to be identifiable by a user. Each product set image 52 can be associated with a product type (e.g. a category)—the product set image 52 may be selected to be representative of the associated product type. Each product set image 52 is associated with a product set comprising one or more products.

In an embodiment, the product(s) for the product set are selected from products stored within a product database. The product database can be interfaced with the merchant database 30 such that each product present within the merchant database 30 is represented as a database entry in the product database 52. For example, the product database is maintained such that it is updated when products are added to, removed from, or modified within the merchant database 30. In this way, the products are indirectly obtained from the merchant database 30. In an alternative embodiment, the virtual marketplace module 50 obtains information for the product(s) directly from the merchant database 30. The virtual interactive device 18 comprises a selection mechanism configured to enable the user of the virtual interactive device 18 to select a feature, such as a product set image 52, displayed within a virtual rendering.

Figure 9A:
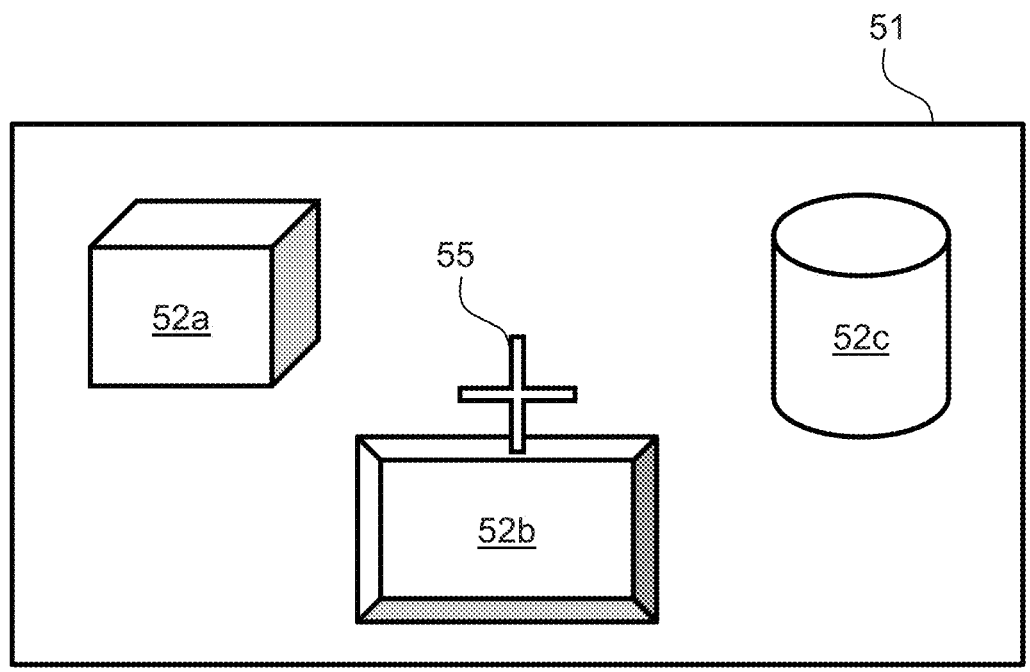
FIGS. 9A and 9B show a visual indicator both non-overlapping, and overlapping, a product image set.
Figure 9B:
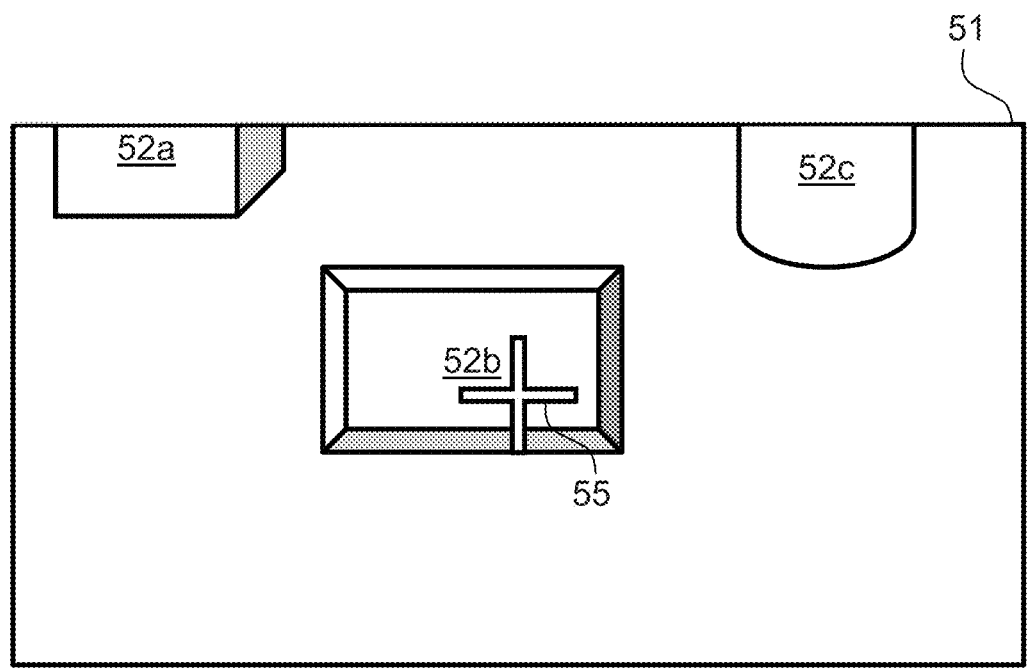

Referring to FIGS. 9A and 9B, in an embodiment, the virtual interactive device 18 comprises a visual selection mechanism. A visual indicator 55 is presented on the display of the virtual interactive device 18 (for example, as a "cross-hair" or "dot"). In an implementation, the visual indicator 55 is perceived as "fixed" in place, such that it does not appear to move relative to the user (as opposed to the virtual store rendering 51, which will change in appearance as the virtual interactive device 18 is moved). The visual indicator 55 may be presented in the middle of the virtual store rendering 51. In a variation, a visual indicator 55 is not displayed, however, a fixed point (relative to the user) is still associated with the user's viewing direction, and may be the centre of the virtual store rendering 51.

A feature (such as a product set image 52) is selected when the user manoeuvres the virtual interactive device 18 such that the visual indicator 55 overlaps the feature (as shown in FIG. 9B—here, the visual indicator 55 is shown overlapping product set image 52*a*). Optionally, a dwell time is implemented, such that the visual indicator 55 is required to overlap the feature for a predefined time period (for example, approximately one second) in order for the feature to be selected. An animation may be provided to indicate the amount of time remaining before selection is effected. In FIG. 9A, the visual indicator 55 is shown not overlapping any one of the product image sets 52. In FIG. 9B, the user has moved the visual interactive device 18 such as to cause the second product image set 52*b* to be overlapped by the visual indicator 55.

In an embodiment, the selection mechanism comprises voice-activated functionality. The user is able to speak commands that are detected by a microphone of the virtual interactive device 18, and a corresponding action taken. For example, a viewing direction (as described above) may be determined to be overlapping a feature, and the user is able to select the feature by speaking a command.

In an embodiment, the selection mechanism comprises a physical interface provided on a body of the virtual interactive device 18, for example comprising one or more buttons and/or a track pad. One or more peripherals may also be provided, such as a keyboard and/or mouse, enabling the user to cause interact with the virtual interactive device 18. For example, a viewing direction (as described above) may be determined to be overlapping a feature, and the user is able to select the feature by pressing a button.

In response to a determination that a product set image 52 has been selected, the virtual marketplace module 50 is configured to present, via the virtual interactive device 18, information on product(s) associated with the product set image 52. In an embodiment, as shown in FIG. 9A, a product list 53 is presented as an overlay within the virtual store rendering 51. The product list 53 can comprise all the products associated with the selected product set image 52, or a selection of said products. The user can then obtain more detailed information on a product by selecting the product from the product list 53 (e.g. by using the selection mechanism described herein). Alternatively, or in addition, the user can be presented with additional options related to the product (such as an option to purchase the product). The information may be presented as a "floating" window containing said information, where the floating window appears to float within the virtual store rendering 51.

In an embodiment, the virtual marketplace module 50 is configured to generate a virtual store-selection rendering. One or more (typically a plurality) of store images are presented within the virtual store-selection rendering, and the user is enabled to select one (e.g. using a selection mechanism described herein). In response, the virtual marketplace module 50 is configured to generate a virtual store rendering 51 associated with the selected store image. In this way, the virtual marketplace module 50 can be configured to provide a user with means for selecting a particular desired virtual store rendering 51 (which may be associated with particular products of interest).

In an embodiment, the virtual interactive device 18 is interfaced with the user tracker. For example, the virtual marketplace module 50 can be configured to implement functionality of the user tracker, or to provide information to a separate user tracker. The user tracker can be configured to receive information such as: products which the user has viewed in the virtual marketplace (e.g. the user may manoeuvre their head in order to view a particular representation of a product and obtain information about that product); products that have been searched for by the user; etc.

In an embodiment, a product list is generated at least in part in accordance with information stored in the user profile 21 of the user. For example, the user profile 21 can comprise information on previous searching activity of the user. This information is utilised in order to determine which product(s) to include within a product list and/or the ordering of product(s) to include in a product list. For example, a product determined to be of higher interest to a user based on information within the user profile 21 may be placed higher on the product list (higher may be interpreted as located at a more prominent position) than other product(s).

Also in an embodiment, each virtual store rendering 51 is associated with a merchant profile 31. Therefore, a product list can be generated, at least in part, in accordance with products identified as being available at the merchant associated with the same merchant profile 31. Each product set image 52 can be associated with a particular category stored within the merchant profile 31 associated with the virtual store rendering 51. For example, categories may include "shirts", "trousers", "other clothing". In another example, categories include "clothing"; "whiteware", "electronics". The product(s) included within a product list associated with a product set image 52 are selected from products labelled as being associated with the category.

In an embodiment, user device 12 is configured to receive a link from another device (for example, another user device 12). The link is selectable by a user of the user device 12. Upon selection of a link, the user device 12 identifies a virtual store rendering 51 to present to the user based on the content of the link.

In an embodiment, two user devices 12 (or more) are in communication with one another—this may include text or voice communication—while the associated users are presented with virtual store renderings 51 and/or virtual store-selection rendering. The users are thereby enabled to communicate with one another, and may use the opportunity to discuss products (in particular, those being rendered). In an implementation, a first user may cause a second user to become aware of a particular product, for example, by undertaking a highlight action whereby the user device 12 of the first user is utilised to identify a product for highlighting to the second user (for example, the first user 12 may utilise a voice command or other input). The user device 12 of the first user communicates to the user device 12 of the second user information indicating that the user device 12 of the second user is to present the highlighted product. This presentation may require authorisation by the second user. The presentation may include additional graphical components to indicate that the product has been highlighted by the first user.

Further modifications can be made without departing from the scope of the invention.

What is claimed is:

1. A messaging system comprising:
   one or more user devices, each associated with a user and configured to:
   receive, via a local wireless channel, a beacon ID from a local beacon device when within a communication distance of the local beacon device, wherein the local beacon device is associated with a particular merchant and located at a physical location of the particular merchant;

communicate, via a network, information enabling a merchant database to identify a merchant profile associated with the particular merchant associated with the local beacon device in response to receiving the beacon ID;

receive, via the network, one or more product messages; and present the one or more product messages to the user of the user device via a user device user interface, an identification server configured to:

maintain the merchant database, wherein the merchant database comprises two or more merchant profiles, each merchant profile comprising data entries associated with one or more products; and maintain a user database comprising one or more user profiles, a comparison server configured to:

receive, from the merchant database, the merchant profile associated with the beacon ID obtained by the user device and a user profile associated with the user device from the user database;

identify, based on the received merchant profile and user profile, at least one product message for communication to the user device; and communicate the at least one product message to the user device via the network, and two or more merchant devices, each comprising a merchant device user interface and associated with a particular merchant and the merchant profile of the particular merchant and in communication, via the network, with the identification server, each merchant device located at the physical location of its associated merchant, such that at least one merchant device is associated with a first merchant and at least one other merchant device is associated with a second merchant, wherein the identification server is further configured to:

in response to identifying the merchant profile associated with the local beacon device upon receipt of the beacon ID from a user device, determine and communicate user information derived from the user profile associated with said user device to at least one merchant device associated with the identified merchant profile, wherein said user information is suitable for enabling a representative of the particular merchant to identify the user associated with the user device, wherein each merchant device is further configured to:

in response to receiving the user information from the identification server, present said user information on the merchant device user interface to thereby enable the representative of the particular merchant to identify the user associated with the received user information, such that the user information presented on the merchant device is associated with the user of the user device currently located in proximity to the local beacon device and therefore in proximity to the physical location of the particular merchant.

2. A messaging system as claimed in claim 1, wherein the user device is a smartphone.

3. A messaging system as claimed in claim 1, wherein the local wireless channel has a range of less than 50 metres.

4. A messaging system as claimed in claim 1, further comprising two or more local beacon devices, wherein at least one local beacon device is associated with a different merchant and a different physical location to at least one other local beacon device.

5. A messaging system as claimed in claim 1, wherein the beacon ID is stored in a memory of the, or each, local beacon device.

6. A messaging system as claimed in claim 1, wherein each merchant profile includes one or more products provided by a merchant associated with the merchant profile.

7. A messaging system as claimed in claim 1, wherein each user profile includes products determined to be of interest to the user associated with the user profile.

8. A messaging system as claimed in claim 1, wherein each merchant profile includes one or more products provided by a merchant associated with the merchant profile, each user profile includes products determined to be of interest to the user associated with the user profile, and the at least one product message is associated with a product present in both the received user profile and the received merchant profile.

9. A messaging system as claimed in claim 8, wherein the comparison server is configured to select the at least one product message randomly.

10. A messaging system as claimed in claim 8, wherein each user profile includes a plurality of hierarchical categories, each associated with at least one item, and wherein the comparison server is configured to select the at least one product message in accordance with items determined to be of relevance to the user.

11. A messaging system as claimed in claim 8, wherein the comparison server is configured to select the at least one product message in accordance with a bidding procedure.

12. A messaging system as claimed claim 1, wherein each user device is configured to present a notification that the at least one product message has been received, and is configured to present the at least one product message via the user device's user interface.

13. A messaging system as claimed claim 1, further comprising a user tracker configured to update the user profile of the user in response to online searching activities of the user.

14. A messaging system as claimed in claim 1, further comprising:

a virtual interactive device configured to:

generate a virtual store rendering including one or more product set images, wherein each product set image is associated with one or more products, and generate a virtual product list in response to a user selection of a product set image, wherein the virtual product list comprises information of the, or each, product associated with a selected product set image, display the virtual store rendering to the user of the virtual interactive device, provide selection mechanism by which the user can select the product set image included within the virtual store rendering, and display the virtual product list generated in response to selection of an associated product set image by the user.

15. A method for providing a message to a user, comprising:

a user device associated with the user receiving, via a local wireless channel, a beacon ID from a local beacon device when within a communication distance of the local beacon device, wherein the local beacon device is associated with a particular merchant and located at a physical location of the particular merchant;

communicating, via a network, information enabling a merchant database to identify a merchant profile associated with the particular merchant associated with the local beacon device in response to receiving the beacon ID;
receiving, via the network, one or more product messages;
presenting the one or more product messages to the user of the user device via a user device user interface;
maintaining the merchant database comprising two or more merchant profiles, each merchant profile comprising data entries associated with one or more products, wherein each merchant profile is associated with a unique merchant and identifies at least one merchant device of its associated merchant, wherein each unique merchant is associated with a unique physical location;
maintaining a user database comprising one or more user profiles;
receiving, by a comparison server from the merchant database, the merchant profile associated with the beacon ID obtained by the user device and a user profile associated with the user device from the user database;
identifying, by the comparison server, based on the received merchant profile and user profile, at least one product message for communication to the user device;
communicating, by the comparison server, the at least one product message to the user device via the network;
in response to identifying the merchant profile associated with the local beacon device upon receipt of the beacon ID from the user device, communicating user information derived from the user profile associated with said user device to at least one merchant device identified in said identified merchant profile as being associated with the identified merchant profile, wherein said user information is suitable for enabling a representative of the particular merchant to identify the user associated with said user device, wherein the at least one merchant device is located at the physical location of the particular merchant; and
in response to receiving the user information from an identification server, presenting said user information on a merchant device user interface of at least one merchant device of the particular merchant to thereby enable the representative of the particular merchant to identify the user associated with the received user information, such that the user information presented on the merchant device is associated with the user device currently located in proximity the local beacon device and therefore in proximity to the physical location of the particular merchant.

16. A messaging system comprising:
one or more user devices, each associated with a user and configured to:
    receive, via a local wireless channel, a beacon ID from a local beacon device when within a communication distance of the local beacon device, wherein the local beacon device is associated with a particular merchant and located at a physical location of the particular merchant;
    communicate, via a network, information enabling a merchant database to identify a merchant profile associated with the particular merchant associated with the local beacon device in response to receiving the beacon ID;
    receive, via the network, one or more product messages; and
    present the one or more product messages to the user of the user device via a user device user interface,
an identification server configured to:
    maintain the merchant database, wherein the merchant database comprises two or more merchant profiles, each merchant profile comprising data entries associated with one or more products; and
    maintain a user database comprising one or more user profiles, and
two or more merchant devices, each comprising a merchant device user interface and associated with the particular merchant and the merchant profile of the particular merchant and being in communication, via the network, with the identification server, each merchant device located at the physical location of its associated merchant, such that at least one merchant device is associated with a first merchant and at least one other merchant device is associated with a second merchant,
wherein the identification server is further configured to:
    in response to identifying the merchant profile associated with the local beacon device upon receipt of the beacon ID from a user device, communicate user information derived from the user profile associated with said user device to at least one merchant device associated with the identified merchant profile, wherein said user information is suitable for enabling a representative of the particular merchant to identify the user associated with said user device,
wherein each merchant device is further configured to:
    in response to receiving the user information from the identification server, present said user information on the merchant device user interface to thereby enable the representative of the particular merchant to identify the user associated with the received user information, such that the user information presented on the merchant device is associated with the user device currently located in proximity the local beacon device and therefore in proximity to the physical location of the particular merchant.

17. A messaging system as claimed claim 1, wherein the user information is further determined by reference to the identified merchant profile and the user profile associated with the user device, such that the user information comprises product information for one or more products determined, based on the identified merchant profile, to be available at the particular merchant and also determined, based on the user profile, to be of interest to the user, wherein the user information is suitable for enabling the representative of the particular merchant to identify, via the merchant device user interface, the one or more products identified in the product information.

18. A messaging system as claimed in claim 1, wherein at least one merchant device user interface is configured to enable the representative of the particular merchant associated with the merchant device to request, via an interaction with the merchant device, the user information via a communication via the network with the identification server, and wherein the identification server is configured to communicate said user information in response to the request.

19. A messaging system as claimed claim 1, wherein the user information communicated to the at least one merchant device associated with the identified merchant profile is determined by reference to the identified merchant profile and the user profile associated with the user device, such that the user information comprises product information for one or more products determined, based on the identified merchant profile, to be available at the particular merchant and also determined, based on the user profile, to be of interest to the user, wherein the user information is suitable for enabling the representative of the particular merchant to identify, via the merchant device user interface, the one or more products identified in the product information, and wherein the at least one merchant device is configured to enable the representative of the particular merchant associated with the merchant device to request, via an interaction with said merchant device, the user information via a communication via the network with the identification server, and wherein the identification server is configured to communicate said user information in response to the request.

20. A messaging system as claimed in claim 3, wherein the local wireless channel has a range of approximately 10 metres or less.

\* \* \* \* \*